(12) United States Patent
Caro Estevez (10) Patent No.: US 10,754,677 B2
(45) Date of Patent: Aug. 25, 2020

(54) PROVIDING A LAYERED IMAGE USING A HIERARCHICAL TREE

(71) Applicant: Red Hat, Inc., Raleigh, NC (US)

(72) Inventor: David Caro Estevez, Barcelona (ES)

(73) Assignee: Red Hat, Inc., Raleigh, NC (US)

( * ) Notice: Subject to any disclaimer, the term of this patent is extended or adjusted under 35 U.S.C. 154(b) by 252 days.

(21) Appl. No.: 15/216,551

(22) Filed: Jul. 21, 2016

(65) Prior Publication Data

US 2018/0024850 A1 Jan. 25, 2018

(51) Int. Cl.
G06F 9/455 (2018.01)
G06F 16/51 (2019.01)
G06F 16/22 (2019.01)
G06F 8/61 (2018.01)

(52) U.S. Cl.
CPC ...... *G06F 9/45558* (2013.01); *G06F 16/2246* (2019.01); *G06F 16/51* (2019.01); *G06F 8/63* (2013.01); *G06F 2009/45562* (2013.01)

(58) Field of Classification Search
None
See application file for complete search history.

(56) References Cited

U.S. PATENT DOCUMENTS

| | | |
|---|---|---|
| 8,108,855 B2 | 1/2012 | Dias et al. |
| 8,327,350 B2 | 12/2012 | Chess et al. |
| 8,543,998 B2 | 9/2013 | Barringer |
| 8,924,930 B2 | 12/2014 | Fries |
| 8,943,441 B1 * | 1/2015 | Patrick .................. G06F 3/0484 715/853 |
| 9,009,705 B2 | 4/2015 | Kundu et al. |
| 9,203,862 B1 | 12/2015 | Kashyap et al. |
| 9,383,989 B1 * | 7/2016 | Qi .............................. G06F 8/65 |
| 2008/0235266 A1 * | 9/2008 | Huang .................... G06F 8/658 |
| 2011/0061046 A1 | 3/2011 | Phillips |
| 2012/0266170 A1 | 10/2012 | Zimmerman et al. |
| 2014/0047436 A1 * | 2/2014 | Jayachandran ........... G06F 8/71 718/1 |

(Continued)

OTHER PUBLICATIONS

Rifenbark, Scott. Yocto Project Development Manual. Intel Corporation. http://www.yoctoproject.org/docs/1.8/dev-manual/dev-manual.html. Web. Jun. 12, 2016. 123 pages.

(Continued)

*Primary Examiner* — Wynuel S Aquino
(74) *Attorney, Agent, or Firm* — Lowenstein Sandler LLP (57) ABSTRACT

A hierarchical tree of nodes for layered images may be maintained. The hierarchical tree may include paths that each includes nodes representing layered images for a virtual machine. A request indicating a child component may be received. A subset of the paths of the hierarchical tree may be identified where each of the subset of the paths includes a child node representing the child component, one or more intermediary nodes representing layered images of intermediary components, and a root node. A path, from the subset of paths, with fewer nodes representing layered images that are not present in a storage of a machine may be selected. Furthermore, the layered images that are not present in the storage of the machine may be provided to the machine to instantiate a virtual machine to execute the child component.

20 Claims, 6 Drawing Sheets

(56) References Cited

U.S. PATENT DOCUMENTS

| | | | | |
|---|---|---|---|---|
| 2014/0108590 A1* | 4/2014 | Hunt | ......................... | G06F 8/63 |
| | | | | 709/217 |
| 2015/0378704 A1* | 12/2015 | Davis | ....................... | G06F 8/60 |
| | | | | 709/217 |
| 2016/0308733 A1* | 10/2016 | Chauhan | ................... | G06F 8/61 |
| 2017/0249218 A1* | 8/2017 | Falkinder | ............ | G06F 11/1453 |
| 2018/0081891 A1* | 3/2018 | Alberti | .............. | G06F 17/30088 |

OTHER PUBLICATIONS

Kellogg-Stedman, Lars. Creating minimal Docker images from dynamically linked ELF binaries. Odd Bits. Feb. 5, 2015. http://blog.oddbit.com/2015/02/05/creating-minimal-docker-images/. Web. Jun. 12, 2016. 7 pages.

\* cited by examiner

PROVIDING A LAYERED IMAGE USING A HIERARCHICAL TREE

TECHNICAL FIELD

The present disclosure relates generally to providing layered images, and more specifically, relates to providing layered images using a hierarchical tree.

BACKGROUND

Virtualization abstracts physical resources to allow multiple virtual environments to share the physical resources. Virtual machines are virtual environments that are able to use allocated resources of a host to execute applications. A hypervisor functions as an interface between the physical resources and virtual machines and allows multiple virtual machines to run on the host. The hypervisor can run directly on hardware without an operating system or as an application running under a traditional operating system. That is, the hypervisor can emulate the underlying physical resource of the host devices.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Implementations of the present disclosure describe a service for provisioning virtual machines (VMs) using layered images that reduces network bandwidth. In general, a virtual machine may be generated on demand in response to a request from a host or host system. When the host requests a virtual machine to be provisioned, the host may specify a particular configuration of the virtual machine. For example, the host may specify settings, applications, application versions, update packages, etc. corresponding to the virtual machine that is to be provisioned.

A number of preconfigured virtual machines may be available as disk images that may be retrieved by (e.g., transmitted to) a host for provisioning a virtual machine based on the corresponding disk image. Each of the disk images may include several components such as a combination of an operating system, multiple applications and user data. Therefore, transmitting an entire disk image to the host may use considerable storage and network resources. When the multiple disk images have similar components, such as a common operating system or application, a larger number of storage and network resources may be consumed despite of some of the virtual machines having common or duplicate components.

Aspects of the present disclosure may address the above and other deficiencies by combining separate layered images to provision a virtual machine. A layered image may refer to a logical portion of a virtual disk image that can be combined with other layered images to provision a virtual machine. For example, a base layered image and one or more additional layered images may be combined to provision a virtual machine. In some implementations, the base layered image may correspond to an operating system that is used by a virtual machine and the one or more additional layered images may correspond to components such as applications or user data used by the virtual machine. Aspects of the present disclosure provide an image data store that stores multiple layered images. For example, the image data store may store multiple base layered images and multiple additional layered images that may be used in conjunction with one or more of the base layered images. In response to a request from a host to provision a virtual machine, a base layered image and/or one or more of the additional layered images may be provided or transmitted from the image data store to the host based on a particular configuration of the virtual machine that is to be provisioned.

A host may locally store one or more layered images. For example, the host may have previously provisioned a virtual machine based on a particular layered image. The host may subsequently request to provision a new virtual machine that can use the locally stored layered image in combination with a new layered image associated with a new component (e.g., a new application). In some implementations, the image data store may store multiple layered images that each correspond to different versions of the component. A version of the component may depend on another layered image such that the version of the component is configured to operate on another specific layered image (e.g., relating to a particular operating system). Thus, when the host requests to provision a new virtual machine that uses a specific component, a compatible layered image (e.g., a compatible version) corresponding to the requested component may be identified based on dependencies. To track and organize the dependencies of each layered image, a hierarchical tree of nodes may be maintained for the image data store. By using the hierarchical tree of nodes, implementations of the present disclosure reduce the amount of network bandwidth that is used to provision a virtual machine. For example, the hierarchical tree of nodes may be used to identify different combinations of multiple layered images on which the component may depend. The combination with the fewest layered images that are not present in a storage of the host may be selected. The layered images in the selected combination that are not present in the storage of the host may subsequently be transmitted from the image data store to the host so that a virtual machine may be provisioned. Accordingly, aspects of the present disclosure reduce utilization of storage by the host since the host no longer needs to store separate disk images for individual virtual machines. In addition, a fewer number of layered images are transmitted to the host for the virtual machine, thereby significantly reducing consumption of network bandwidth. Furthermore, by using a hierarchical tree for the image data store, aspects of the present disclosure significantly reduce computing resources involved in identifying what layered images should be transmitted to the host.

Figure 1:
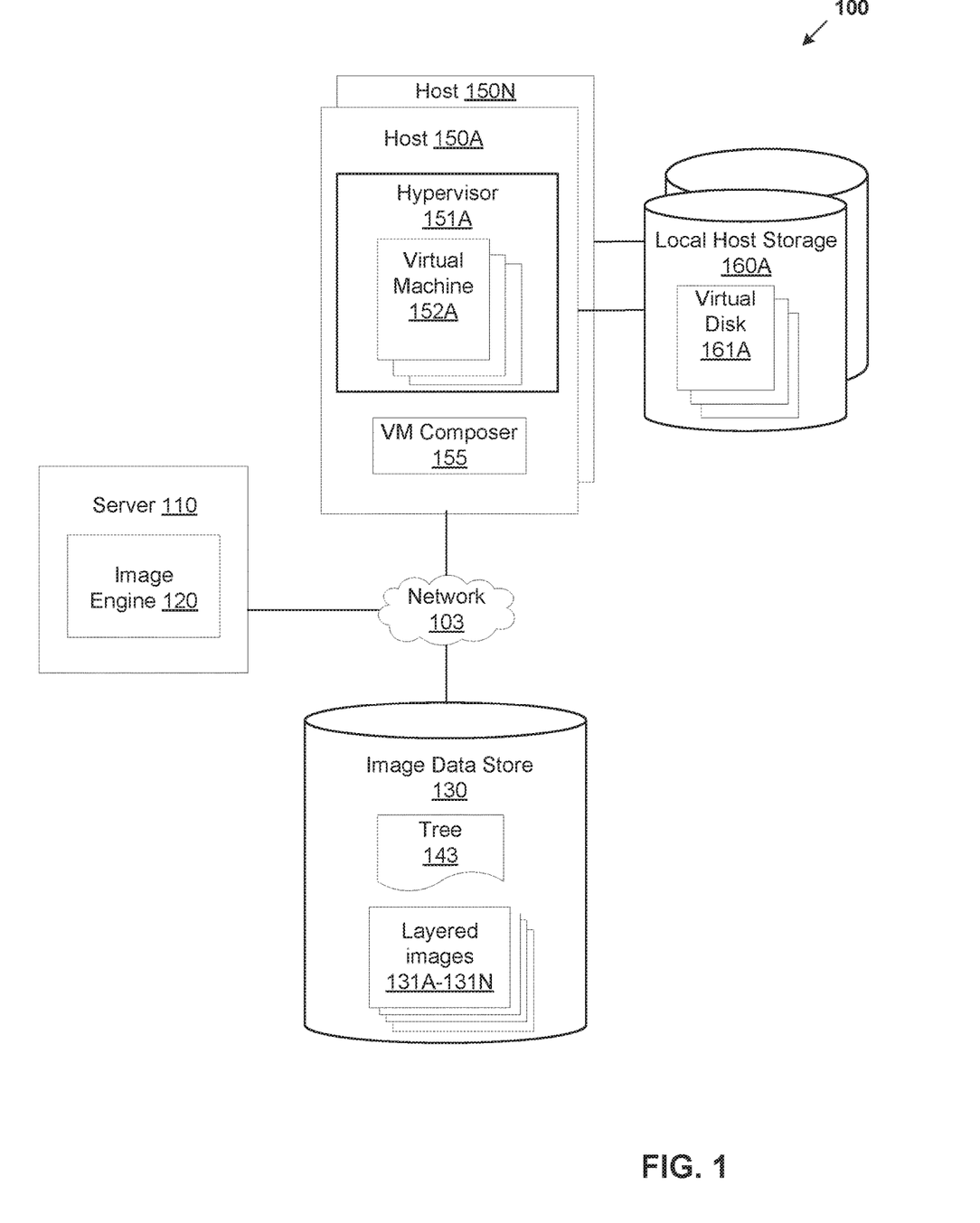
FIG. 1 is an example network architecture in which various implementations of the present disclosure can operate.

FIG. 1 is an example network architecture 100 in which various implementations of the present disclosure can operate. The network architecture 100 includes a server 110 and an image data store 130 that can connect to one or more host devices 150A-150N via one or more networks 103. The network 103 can be public networks (e.g., the Internet), private networks (e.g., a local area network (LAN) or wide area network (WAN)), or a combination thereof.

The one or more host devices 150A-150N can include, and are not limited to, any data processing device, such as a desktop computer, a laptop computer, a mainframe computer, a personal digital assistant, a server, a handheld device or any other device configured to process data. The one or more host devices 150A-150N have hardware resources (e.g., a processor, a local host storage 160A, etc.) and virtual machine resources (e.g., a hypervisor 151A) that are configurable to host one or more virtual machines (e.g., virtual machines 152A-152N). Virtualized machines allow a physical machine (e.g., the host device 152A) to operate as several different machines. In an implementation, a single host device 152A can host multiple virtual machines (e.g., virtual machines 152A-152N). The one or more virtual machines 152A-152N can execute one or more applications with access to resources (e.g., central processing units (CPUs), storage system, files, configurations, libraries, etc.) of the host device 150A.

The host device 150A executes the hypervisor 151A to instantiate and run the one or more virtual machines 152A-152N. The hypervisor 151A can be implemented in software and emulate and export a bare machine interface to higher level software. In another implementation, the hypervisor 151A can run directly on bare platform hardware. In another implementation, the hypervisor 151A is run on top of a host operating system (OS). Alternatively, for example, the hypervisor 151A may be run within, or on top of, another hypervisor. Hypervisors 151A-151N may be implemented, for example, in hardware, software, firmware or by a combination of various techniques. The hypervisor 151A presents to other software (i.e., "guest" software) the abstraction of one or more virtual machines 152A-152N, which may provide the same or different abstractions to various guest software (e.g., guest operating system, guest applications, etc.).

To instantiate a virtual machine, the hypervisor 151A combines resources (e.g., processing, memory, communications, storage, and other available hardware) to build the virtual machine 152A. In an implementation, the hypervisor combines layered image from a virtual disk 161A stored in the local host storage 160A. A whole disk image (e.g., virtual disk 161A) may be a file or collection of files that is perceived as a hard disk. A virtual disk 161A may include a directory structure, files, etc. The virtual disk 161A may encapsulate a virtual machine, which may include an OS and/or installed applications. The host device 150A can instantiate the virtual machine 152A by mounting the local host storage 160A, loading a virtual disk 161A and starting an OS included in the layered image.

Each virtual machine 152A-152N includes a guest operating system (guest OS) that hosts one or more applications within the virtual machine. The guest OSes running on the virtual machines can be of the same or different types (e.g., all may be Windows operating systems, or some may be Windows operating systems and the others may be Linux operating systems). The guest OSes and the host OS may share the same operating system type, or the host OS may be a different type of OS than one or more guest OSes.

A layered image may be part of a volume chain comprising one or more copy-on-write (COW) volumes. Layered images of components may depend directly or indirectly on another layered image. For example, components can be an operating system, an application, an update package, user data, etc. A component of a layered image may be configured or compatible with a particular version of a component of another layered image. Thus, the layered image depends on the other layered image if the component or configuration of the component relies on the other layered image's component for compatibility, as described in greater detail below in conjunction with FIGS. 2-4. For example, a version of a web server package may be designed for a specific version of an OS. As such, the layered image of the version of the web server package may be considered to depend on the version of the layered image of the OS.

A disk image can be created by combining or layering read-only layered images (i.e., COW layers). For example, one or more volumes may be added to the volume chain during the lifetime of the virtual machine 152A. Adding a new layered image 131B for a new volume may be triggered by making the previous volume read-only (e.g., responsive to receiving a command via an administrative interface). The hypervisor 151A can locate data of the virtual disk 161A by accessing, transparently to the virtual machine 152A, each volume of the chain of volumes, starting from the most recently added volume.

The one or more host devices 150A-150N may be a single machine or multiple host devices arranged in a cluster. In an implementation, the host devices 150A-150N can be a collection of remote computing devices in a cloud (not shown) that are available to a user (not shown) via a network (e.g., the network 103).

In an implementation, the host device 150A includes a VM composer 155 that can request layered images 131A from network storage (e.g., image data store 130) to load layered images 131A-131N in the virtual disk 161A for the virtual machine 152A. The VM composer 155 may be executed by the host device 150A to facilitate communication with a remote provisioning service (e.g., image engine 120) that manages and maintains the image data store 130.

In some implementations, the VM composer 155 is hosted by a stand-alone device or is distributed across multiple network devices (not shown). The VM composer 155 can include an interface (e.g., an application programming interface (API)) to communicate with the server 110, other host devices 150A-150N, as well as access local host storage 160A and networked data stores (e.g., image data store 130).

In an implementation, the VM composer 155 requests components that are combined to build virtual machines 152A-152N from the server 110. For example, the host device 150A can request components to build and launch a virtual storefront, messaging site, and/or any other application. To efficiently build and launch a magnitude of virtual machines, the host device 150A can request, from the server 110, multiple layered images 131A-131N to instantiate a variety of virtual machines 152A-152N.

The server 110 can include, but is not limited to, any data processing device, such as a desktop computer, a laptop computer, a mainframe computer, a personal digital assistant, a server, a handheld device or any other device configured to process data. In an implementation, the server 110 hosts an image engine 120 that communicates with the one or more host devices 150A-150N, and manages the image data store 130.

In an implementation, the image engine 120 receives and processes sets of scripts (i.e., recipes) that define different layered images and relationships between them. The image engine 120 processes (e.g., executes) the scripts to generate multiple layered images 131A-131N and stores the generated layered images 131A-131N in the image data store 130. For example, a script can be used to create a layered image for a specific component such as an application.

In implementations, the image engine 120 creates and maintains a hierarchical tree 143 for layered images 131A-131N. The hierarchical tree 143 includes nodes that represent layered images 131A-131N. Each child node in the tree 143 may be associated with a label specifying a corresponding component and one or more other components on which the corresponding component depends directly or indirectly. The image engine 120 uses the tree 143 to retrieve the appropriate layered image from the image data store 130 and transmit the appropriate layered image to the host 150 for provisioning a virtual machine 152A. The VM composer 155 can combine the transmitted layered images with layered images stored in local host storage 160A to create a virtual disk 161A that can be used by the hypervisor 151A to instantiate the virtual machine 152A.

Figure 2:
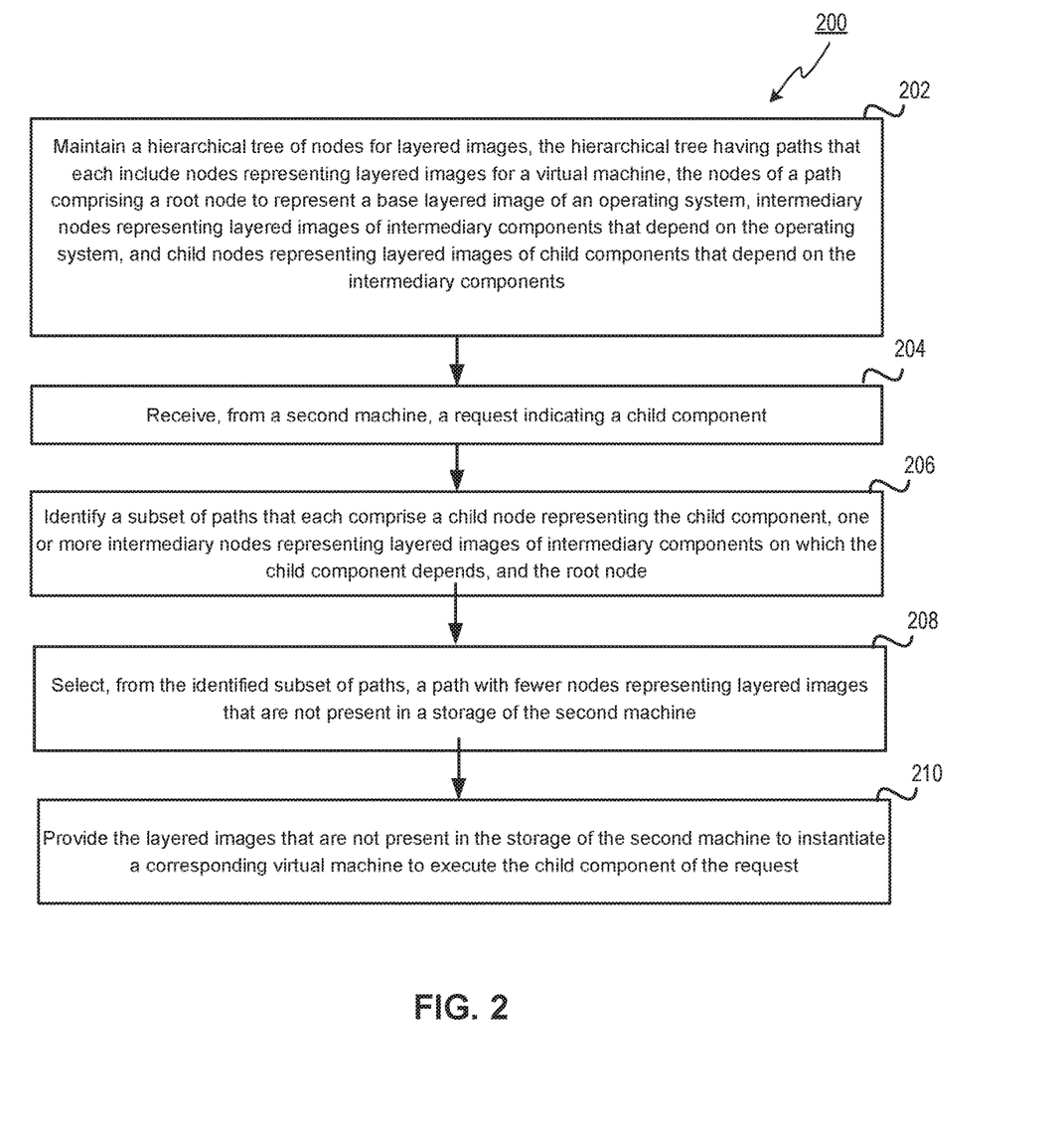
FIG. 2 is a flow diagram for a method to provide layered images to instantiate a virtual machine in accordance with the present disclosure.

FIG. 2 is a flow diagram of a method 200 to provide layered images to instantiate a virtual machine. Method 200 may be performed by a processing device that may include hardware (e.g., circuitry, dedicated logic), software, computer readable instructions (e.g., run on a general purpose computer system or a dedicated machine), or a combination thereof. In an implementation, method 200 is performed by a VM composer module (e.g., VM composer module 155 of FIG. 1) or an image engine (e.g., image engine 120).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by server 110 and/or hosts 150A-150N as shown in FIG. 1.

The method 200 may begin by the processing device maintaining a hierarchical tree of nodes for multiple layered images (block 202). In an implementation, one or more scripts or recipes may be used to create the hierarchical tree of nodes as described in conjunction with FIG. 3. In one example, the hierarchical tree may be a binary tree where each child node depends from a single parent node.

In an implementation, the hierarchical tree may be a data structure that includes a root node to represent a base layered image of an operating system and child nodes to represent layered images of child components that depend directly or indirectly from the root node. For example, a child node may be the last node in the path and an intermediary node representing a layered image of an intermediary component that depends on the operating system. Since each child node represents a layered image of a child component that depends directly or indirectly from the root node, the hierarchical tree includes at least one path from the root node to each child node.

As an example, a child node may represent a layered image of an update package, an intermediary node may represent an intermediary layered image of an application associated with the update package (e.g., the update package modifies the function of the application), and the root node may represent a layered image of an operating system. The intermediary node may be considered a parent node of the child node and a child node of the root node (or another intermediary node) and the root node may be considered a parent node of the intermediary node.

In an implementation, the hierarchical tree includes multiple paths that each include multiple nodes (e.g., a child node, one or more intermediary nodes, and the root node) representing layered images for a virtual machine. For example, the multiple nodes of a path include the root node that represents a base layered image of an operating system, intermediary nodes representing layered images of intermediary components that depend on the operating system, and child nodes representing layered images of child components that depend on the intermediary components.

At block 204, the processing device receives, from a second machine (e.g., one of host 150A-N), a request indicating a child component. The request may identify a particular component (e.g., an application) without specifying a particular version of the application. For example, the processing device receives a request for a web server application that corresponds to multiple layered images of different versions of the web server application. The child component may be used in the instantiation of a virtual machine.

At block 206, the processing device identifies a subset of paths from the hierarchical tree that each includes a child node representing the child component, one or more intermediary nodes representing layered images of intermediary components on which the child component depends, and the root node. For example, each path of the hierarchical tree that includes a child node representing a version of the requested component may be identified. Thus, different child nodes that represent different versions of the requested component may be identified from the multiple paths of the hierarchical tree.

In an implementation, each node is associated with a label that identifies preceding nodes in the path from the respective child node to the root node. For example, each label associated with a node may identify a component name and a component version combined with the labels associated with the intermediary nodes in the path and the root node. Thus, the subset of paths may be identified by the labels of child nodes matching the component of the request.

At block 208, the processing device selects, from the identified subset of paths, a path with fewer nodes representing layered images that are not present in a storage of the second machine. For example, the second machine may provide a list or identification of layered images that are present in the storage of the second machine. The list of layered images present in the storage of the second machine may be compared with the nodes representing layered images from the subset of paths. A number of nodes representing layered images of components that are not present in the storage of the second machine may be identified for each of the subset of paths. The path with the fewest or a fewer number of nodes path representing layered images that are not present in the storage may be selected.

At block 210, the processing device provides the layered images that are not present in the storage of the second machine to instantiate a corresponding virtual machine to execute the child component of the request. For example, the provided layered images may be combined with one or more of the layered images that are present in the storage of the second machine to instantiate the corresponding virtual machine.

In some implementations, information associated with the hierarchical tree of nodes (i.e., a manifest) may be transmitted or sent to the second machine. In an implementation, the transmitted information may include the identified subset of paths and may not include paths that do not include a child node corresponding to the requested component. The second machine may use the information to identify the particular path from the subset of paths with the fewest number of nodes that represent layered images that are not present in the storage of the second machine. The second machine may subsequently transmit an identification of the particular path and the layered images that are not present in the storage of the second machine. In response to the received identification of the particular path, the layered images that are not present in the storage of the second machine may be transmitted to the second machine.

Figure 3:
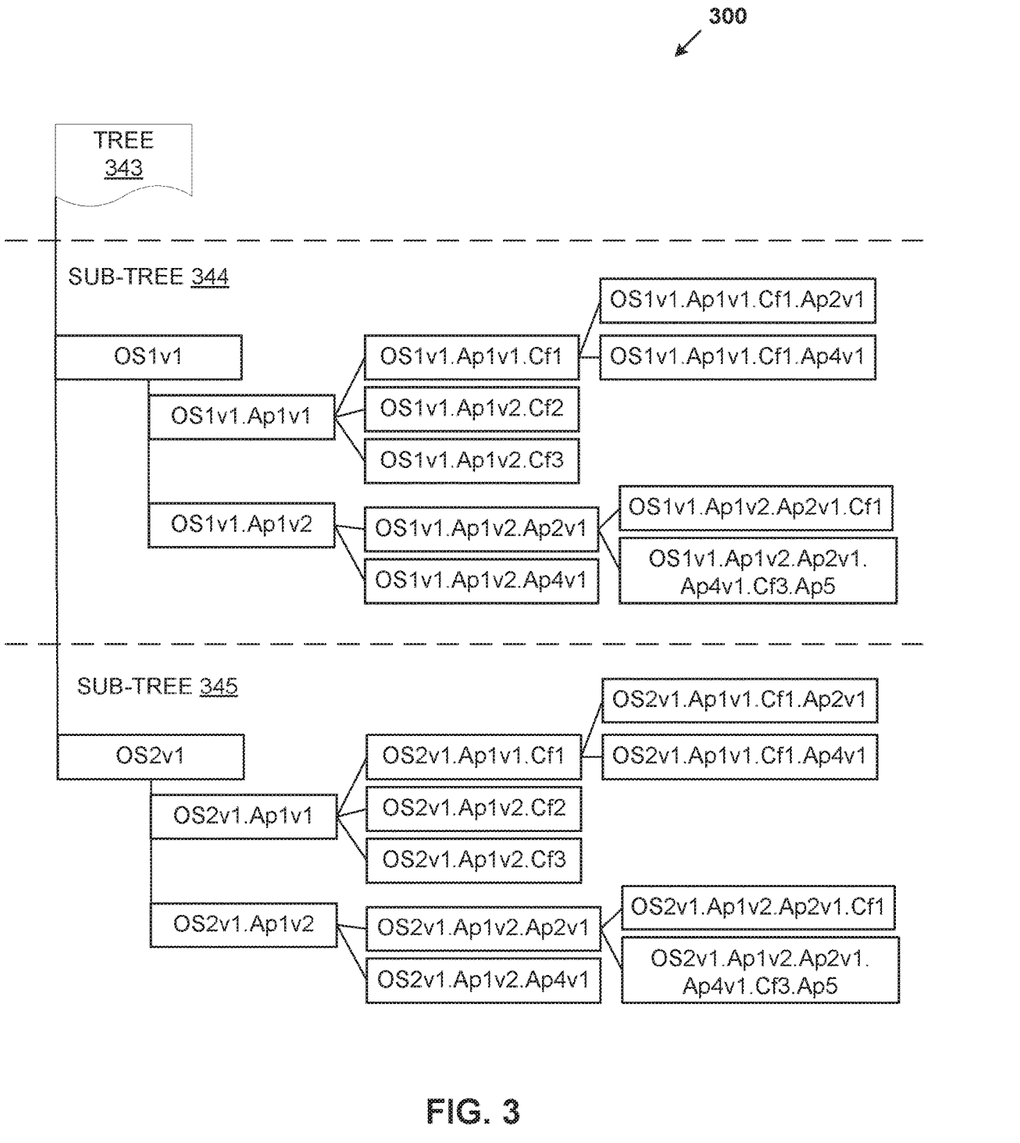
FIG. 3 is a block diagram of an example hierarchical tree according to an implementation of the present disclosure.

FIG. 3 is a block diagram of an exemplary hierarchical tree 300. Hierarchical tree 300 (e.g., tree 143 of FIG. 1) depicts a graph of relationships between layered images (e.g., layered images 131A-131N of FIG. 1) stored in a data store (e.g., image data store 130 of FIG. 1).

The hierarchical tree 300 may be maintained or generated using one or more recipes or scripts. A recipe is a set of instructions that describe a template for a component of a layered image and criteria to create one or more variations of the template. The scripts or recipes identify a particular layered image of a component and specifies other components on which the particular component depends (e.g., which components it is compatible with). Dependency data may be defined in each recipe as information identifying the relationships between the components represented by the layered images. For example, an application may be compatible with a specific OS and therefore depend on a root layered image of the specific OS in order to be executable.

Dependencies may be detected relating to the base layered image associated with the root node by a dependency search that analyzes one or more scripts or recipes. Once a dependency between two or more components specified in two or more recipes is discovered using a dependency search, layered image relationships are represented via an edge between the corresponding nodes in the hierarchical tree. The dependency search can identify a highest tier of nodes as having most common dependency among recipes. For example, a layered image of an application that relies on a particular operating system corresponding to a base layered image may be considered as having a dependency on the particular operating system. Additional tiers of nodes can be added to the first tier of parent nodes off of the root node that all share common dependencies.

In an implementation, hierarchical tree 343 with multiple sub-trees 344 and 345 may be generated and maintained. Each sub-tree 344 and sub-tree 345 may include a root node representing a base layered image of a different OS (e.g., a different type of OS or a different version of the same type of OS). For example, the root node of sub-tree 344 represents the layered image of OS1v1 (e.g., a first type of operating system) and the root node of sub-tree 345 represents the layered image of OS2v1 (e.g., a second type of operating system). In an implementation, the hierarchical tree 343 is characterized by the dependency relationships of the layered images. In an example, such as in a COW file system, the hierarchical tree 343 may be a binary tree where dependent layered images depend from a single base layered image and are not shared by multiple base layered images.

Each new child node (e.g., OS2v1.Ap1v1 to OS2v1.Ap1v2.Ap2v1.Ap4v1.Cf3.Ap5) corresponds to a layered image executable on the layered image of the OS associated with the root node (e.g., OS2v1). Different versions of the components of layered images can be associated with one or more root nodes. For example, a recipe can include a set of instructions that describe a template for an application Ap2 (e.g., WordPress) and criteria that identifies the application's dependency on another application Ap1 (e.g., Apache webserver). If the hierarchical tree 343 includes several root nodes OS1v1 and OS2v1 representing base layered images for different operating systems, then each root node may have a child node representing a different version of a layered image of the application Ap1. Subsequently, different versions of the layered image of the application Ap2 that depend from the layered images of application Ap1 associated with different root nodes may be created. For example, child node OS1v1.Ap1v1.Cf1 representing the layered image of application Ap1 associated with root node OS1v1 may be a parent node to the childe node OS1v1.Ap1v1.Cf1.Ap2v1 representing a version of application Ap2. A different version of the layered image of application Ap2 can be represented by another childe node OS2v1.Ap1v1.Cf1.Ap2v1 representing a version of application Ap2 that depends on layered image of application Ap1 associated with another root node representing the layered image of OS2v1.

In an implementation, the hierarchical tree 343 of nodes may be maintained by inserting a new intermediary node in the hierarchical tree representing a new layered image of a new intermediary component. For example, if a new script or recipe is received to create a new layered image, then the new intermediary node may be inserted into the hierarchical tree 343 based on dependencies of the new layered image that are specified by the new script or recipe. Thus, the child nodes representing layered images of child components that depend on the new intermediary component may be updated to represent a dependency with the new intermediary node that represents the new intermediary component.

Figure 4:
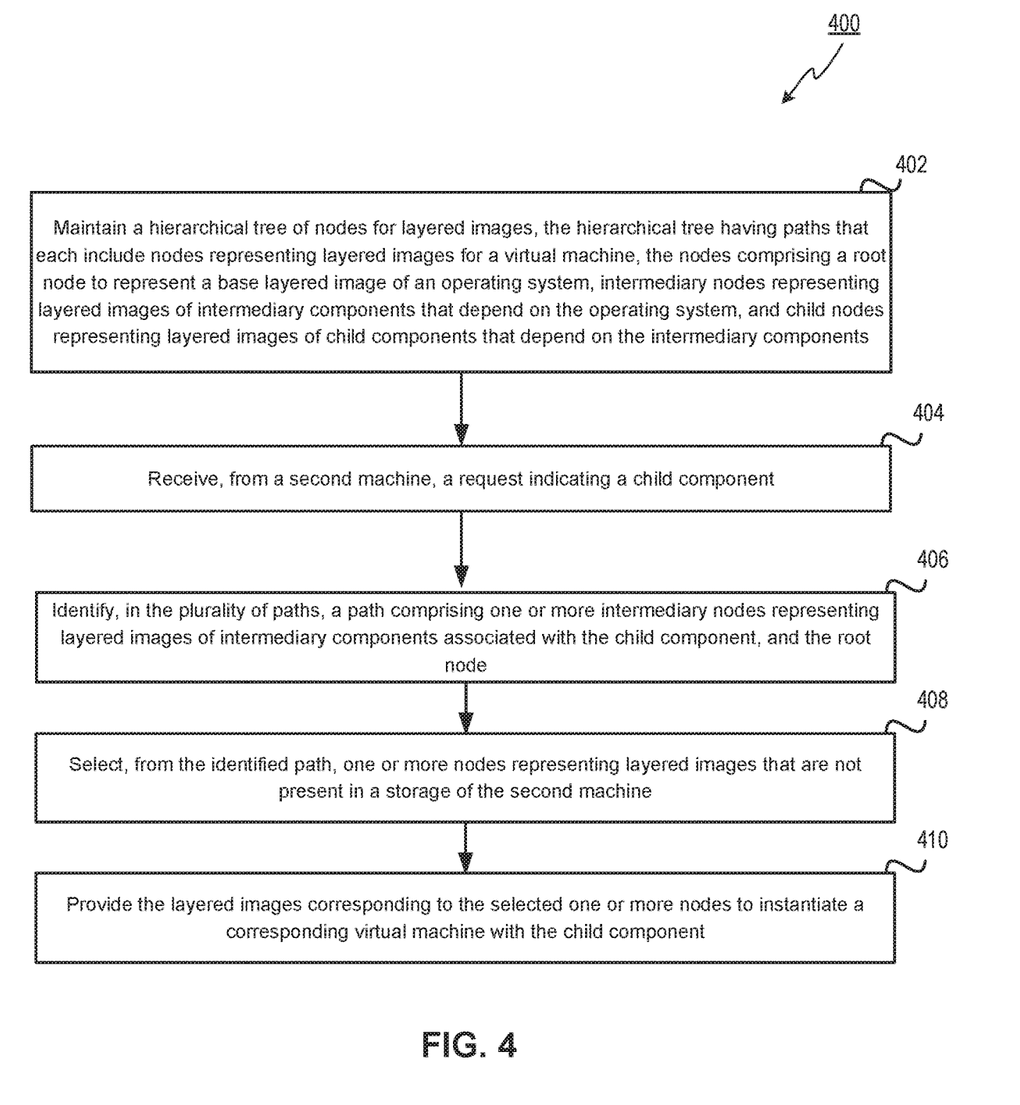
FIG. 4 is a flow diagram for another method to provide layered images to instantiate a virtual machine in accordance with one or more implementations of the present disclosure.

FIG. 4 is a flow diagram for a method 400 to provide layered images to instantiate a virtual machine. Method 400 can be performed by processing logic that can include hardware (e.g., circuitry, dedicated logic, programmable logic, microcode, etc.), software (e.g., instructions run on a processing device), or a combination thereof. In an implementation, method 400 is performed by a VM composer module (e.g., VM composer module 155 of FIG. 1) or an image engine (e.g., image engine 120).

The method 400 may begin with the processing device maintaining a hierarchical tree of nodes for multiple layered images (block 402). In an implementation, the hierarchical tree includes a single root node to represent a base layered image of an operating system from which depends intermediary nodes representing layered images of intermediary components that depend on the operating system, and child nodes representing layered images of child components that depend on the intermediary components. The hierarchical tree has multiple paths that each includes nodes representing layered images for a virtual machine. As discussed above with regards to FIGS. 2 and 3, each node is a label with a component name and a version number combined with node labels of the intermediary nodes.

In an implementation with the single root node, the hierarchical tree has a single path to each child node representing layered images of child components that depend on the intermediary components via zero or more intermediary nodes representing layered images of intermediary components that depend on the operating system. That is, when the child node depends directly from the root node, it can be said there are zero intermediary nodes in the path to the child node.

At block 404, the processing device receives, from a second machine, a request indicating a child component. At block 406, the processing device identifies the path with the child component, one or more intermediary nodes representing layered images of intermediary components associated with the child component, and the root node. In some implementations, the request indicating the child component may identify a specific version of the child component. The path that is identified may include a child node corresponding to the specific version of the child component from the request. In some implementations, the request may not indicate any version of the child component and the path that includes a child node corresponding to the latest version of the child component may be identified. In the same or alternative embodiments, the request may identify layered images present in the storage of the second machine and the path that includes the child node corresponding to the latest version of the child component that is compatible with at least one of the layered images present in the storage of the second machine may be identified.

At block 408, in response to determining that one or more intermediary nodes are in the identified path with the child component and the root node, the processing device selects one or more nodes representing layered images that are not present in a storage of the second machine. In an implementation, to select, from the identified path, the processing device sends, to the second machine, information about the nodes representing layered images in identified path on which the child component depends, and receives, from the second machine, a list of one or more nodes representing layered images that are not present in a storage of the second machine.

At block 410, the processing device provides the layered images corresponding to the selected one or more nodes to instantiate a corresponding virtual machine with the child component.

Figure 5:
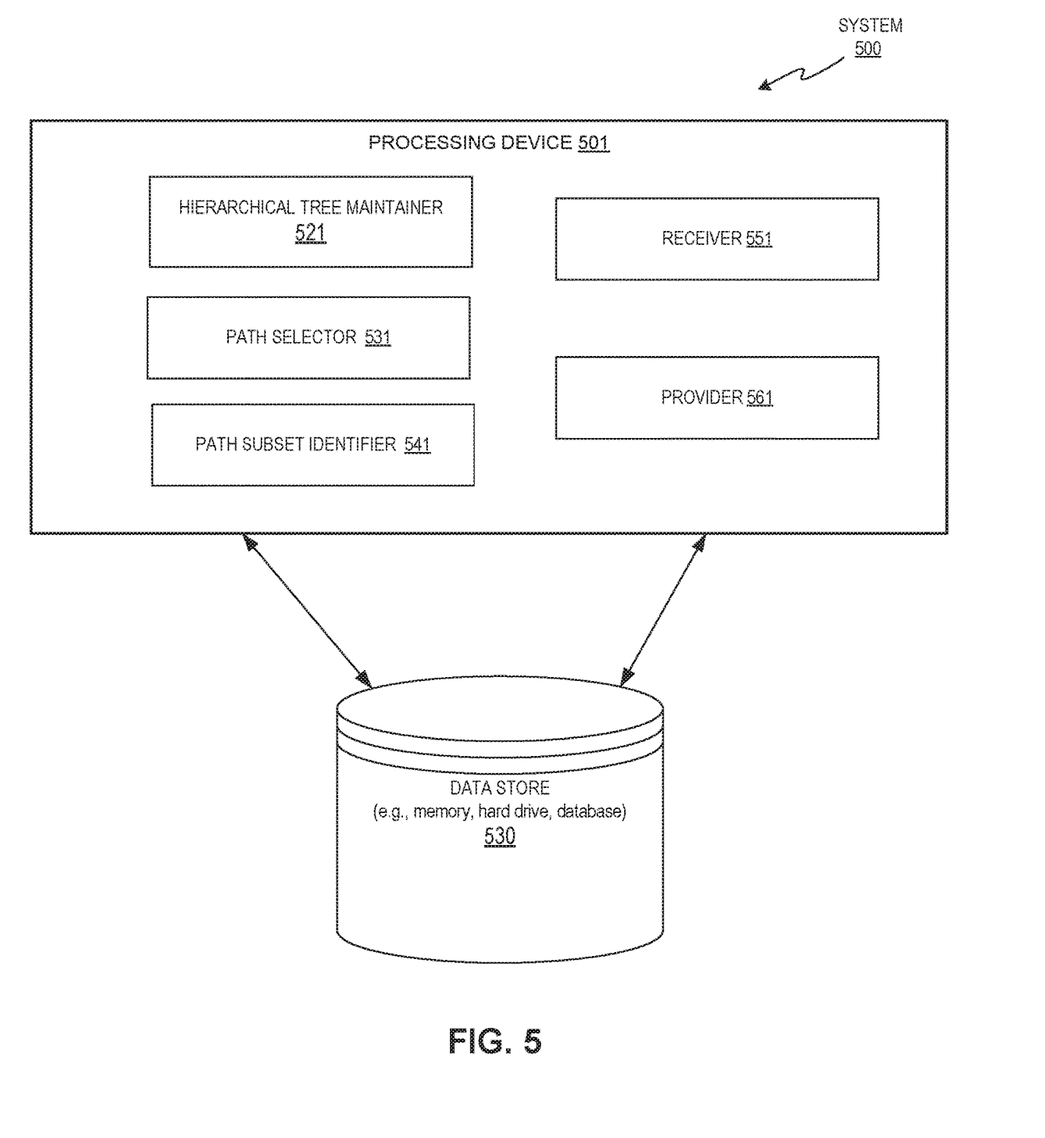
FIG. 5 illustrates an example system in which implementations of the disclosure can operate.

FIG. 5 illustrates an example system 500 (e.g., server 110, image engine 120, image data store 130, or other computing devices within a distributed system). System 500 includes components for providing layered images stored in a data store 530 to instantiate different virtual machines on a host device (e.g., hosts 150A-150N of FIG. 1). System 500 can include a processing device 501 including instructions to execute a hierarchical tree maintainer 521, a path selector 531, a path subset identifier 541, a receiver 551, and provider 561.

The hierarchical tree maintainer 521 may maintain a hierarchical tree of nodes for a plurality of layered images as previously described. Furthermore, the receiver 551 may receive a request indicating a child component. For example, the request may be received from a second machine. The path subset identifier 541 may identify a subset of paths that each includes a child node that represents the child component as previously described in conjunction with FIG. 3. The path selector 531 may select from the subset of paths a path with fewer nodes representing layered images that are not present in the storage of the second machine. Furthermore, the provider 561 may provide the layered images that are not present in the storage of the second machine to instantiate a corresponding virtual machine to execute the child component.

Figure 6:
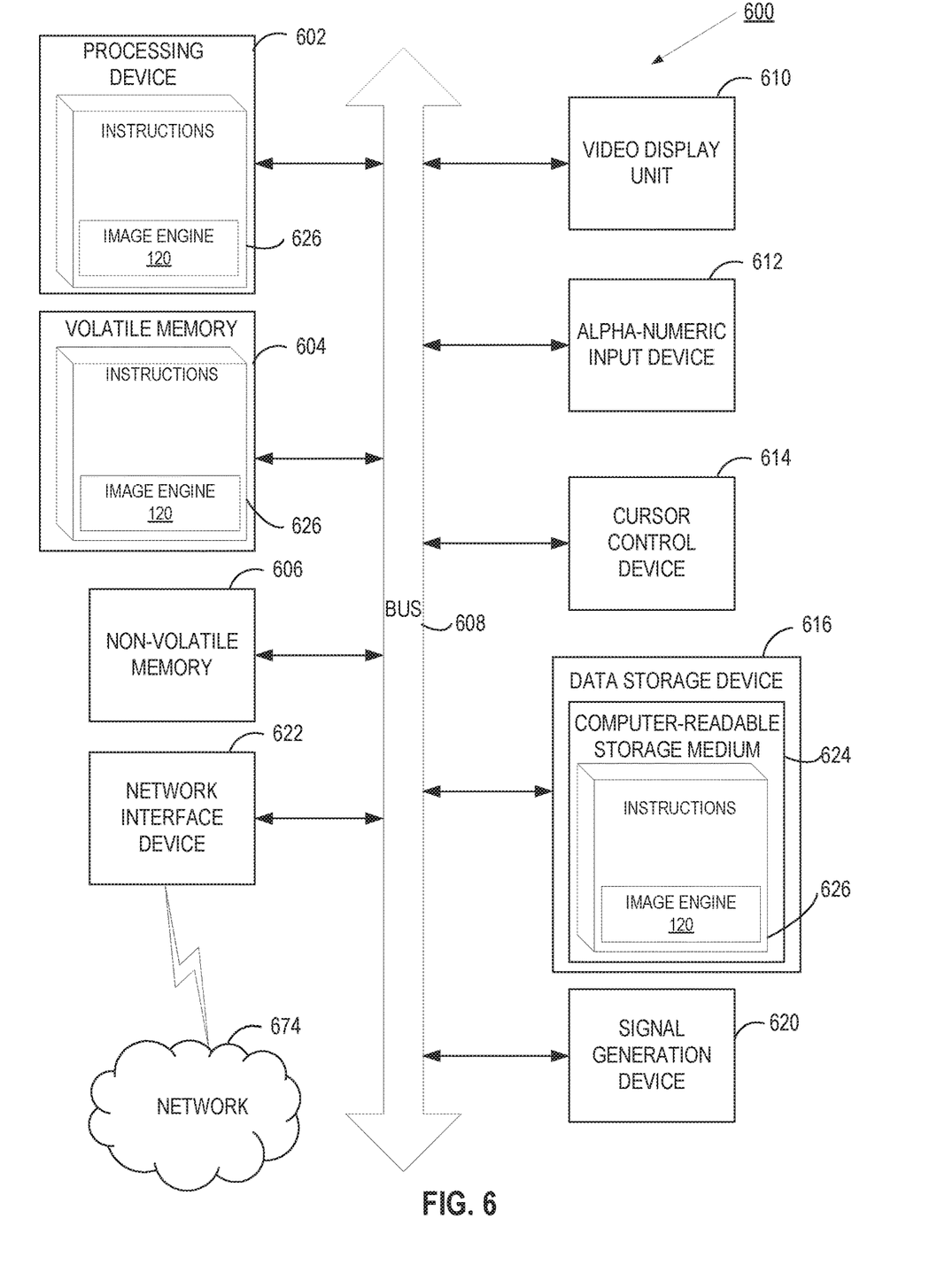
FIG. 6 depicts a block diagram of a computer system operating in accordance with one or more aspects of the present disclosure.

FIG. 6 depicts a block diagram of a computer system operating in accordance with one or more aspects of the present disclosure. In various illustrative examples, computer system 600 may correspond to a computing device within system architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding an image engine 120 of FIG. 1 for implementing methods 200 or 400.

Instructions 626 for the image engine may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "maintaining," "receiving," "identifying," "selecting," "providing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 or 300 and/or each of the individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
maintaining, by a processing device of a first server, a hierarchical tree of nodes for a plurality of layered images of virtual machines provided by a second server, the hierarchical tree having a plurality of paths that each include a plurality of nodes representing layered images for a virtual machine, the plurality of nodes of a path comprising a root node, intermediary nodes representing layered images of intermediary components, and child nodes representing layered images of child components;
receiving, from the second server a request indicating a child component;
identifying, in the plurality of paths, a subset of paths that each comprise a child node representing the child component, one or more intermediary nodes representing layered images of intermediary components on which the child component depends, and the root node;
obtaining, from the second server, an identification of layered images that are present in a storage of the second server;
selecting, using the obtained identification of layered images, from the identified subset of paths, a path with fewer nodes representing layered images that are not present in the storage of the second server and that are compatible with another layer present at the second server to instantiate a corresponding virtual machine with the child component; and
providing, to the second server, the layered images that are not present in the storage of the second server to instantiate the corresponding virtual machine with the child component of the request.

2. The method of claim 1, further comprises: sending, to the second server, information about the hierarchical tree of nodes for one or more layered images that are used with the child component indicated by the request.

3. The method of claim 1, wherein providing the layered images to the second server comprises causing the layered images to be transmitted from an image data store to the second server.

4. The method of claim 1, wherein providing the layered images to the second server comprises causing the layered images to be transmitted from an image data store, wherein the image data store is located outside the first server and is accessible to the first server via a network connection between the image data store and the first server.

5. The method of claim 1, wherein each node is a label with a component name and a version number combined with node labels of a preceding intermediary node and the root node in a respective path of each node.

6. The method of claim 1, wherein one or more recipes are used to populate the hierarchical tree of nodes, wherein each recipe comprises a set of instructions for a respective component represented by each node, and identifies whether the respective component depends on one or more intermediary components and an operating system.

7. The method of claim 1, wherein the child component is an update to an intermediary component, an application to be used with the intermediary component, or user data associated with the intermediary component.

8. The method of claim 1, wherein maintaining the hierarchical tree of nodes for a plurality of layered images comprises:
in response to receiving a recipe corresponding to a new intermediary component, inserting a new intermediary node in the hierarchical tree representing a new layered image of the new intermediary component; and
updating the child nodes representing layered images of child components that depend on the new intermediary component.

9. A system comprising:
a memory; and
a processing device of a first server, operatively coupled with the memory, to:
maintain a hierarchical tree of nodes for a plurality of layered images, the hierarchical tree having a plurality of paths that each include a plurality of nodes representing layered images for a virtual machine, the plurality of nodes of a path comprising a root node, intermediary nodes representing layered images of intermediary components, and child nodes representing layered images of child components;
receive, from a second server a request indicating a child component;
identify, in the plurality of paths, a subset of paths that each comprise a child node representing the child component, one or more intermediary nodes representing layered images of intermediary components on which the child component depends, and the root node;
obtain, from the second server, an identification of layered images that are present in a storage of the second server;
select, using the obtained identification of layered images, from the identified subset of paths, a path with fewer nodes representing layered images that are not present in the storage of the second server and that are compatible with another layer present at the second server to instantiate a corresponding virtual machine with the child component; and
provide, to the second server, the layered images that are not present in the storage of the second server to instantiate the corresponding virtual machine with the child component of the request.

10. The system of claim 9, wherein the processing device is further to:
send, to the second server, information about the hierarchical tree of nodes for one or more layered images that are used with the child component indicated by the request.

11. The system of claim 9, wherein to provide the layered images to the second server, the processing device is to cause the layered images to be transmitted from an image data store to the second server.

12. The system of claim 9, wherein to provide the layered images to the second server, the processing device is to cause the layered images to be transmitted from an image data store, wherein the image data store is located outside the first server and is accessible to the first server via a network connection between the image data store and the first server.

13. The system of claim 9, wherein each node is a label with a component name and a version number combined with node labels of a preceding intermediary node and the root node in a respective path of each node.

14. The system of claim 9, wherein one or more recipes are used to populate the hierarchical tree of nodes, wherein each recipe comprises a set of instructions for a respective component represented by each node, and identifies whether the respective component depends on one or more intermediary components and an operating system.

15. A non-transitory computer readable storage medium comprising instructions that, when executed by a processing device, cause the processing device to:
maintain, by the processing device of a first server, a hierarchical tree of nodes for a plurality of layered images, the hierarchical tree having a plurality of paths that each include a plurality of nodes representing layered images for a virtual machine, the plurality of nodes comprising a root node, intermediary nodes representing layered images of intermediary components, and child nodes representing layered images of child components;
receive, from a second server a request indicating a child component;
identify, in the plurality of paths, a path comprising a child node representing the child component, one or more intermediary nodes representing layered images of intermediary components associated with the child component, and the root node;
obtain, from the second server, an identification of layered images that are present in a storage of the second server;
select, using the obtained identification of layered images, from the identified path, one or more nodes representing layered images that are not present in the storage of the second server and that are compatible with another layer present at the second server to instantiate a corresponding virtual machine with the child component; and
provide, to the second server, the layered images corresponding to the selected one or more nodes to instantiate the corresponding virtual machine with the child component.

16. The non-transitory computer readable medium of claim 15, wherein to select, from the identified path, the one or more nodes representing layered images that are not present in the storage of the second server, the processing device is further to:
send, to the second server, information about the one or more nodes representing the layered images in the identified path comprising the child node representing the child component; and
receive, from the second server, an identification of whether each of the layered images represented by the one or more nodes are not present in the storage of the second server.

17. The non-transitory computer readable medium of claim 15, wherein to provide the layered images to the second server, the processing device is to cause the layered images to be transmitted from an image data store, wherein the image data store is located outside the first server and is accessible to the first server.

18. The non-transitory computer readable medium of claim 15, wherein each node is a label with a component name and a version number combined with node labels of a preceding intermediary node and the root node in a respective path of each node.

19. The non-transitory computer readable medium of claim 15, wherein the child component is an update to an intermediary component, an application to be used with the intermediary component, or user data associated with the intermediary component.

20. The non-transitory computer readable medium of claim 15, wherein to maintain the hierarchical tree of nodes for a plurality of layered images, the processing device is further to:
insert a new intermediary node in the hierarchical tree representing a new layered image of a new intermediary component; and
update the child nodes representing layered images of child components that depend on the new intermediary component.

* * * * *